United States Patent
Aaltonen

(10) Patent No.: US 8,095,137 B2
(45) Date of Patent: Jan. 10, 2012

(54) METHOD, SYSTEM, NETWORK ENTITY, AND END-USER TERMINAL FOR CONTROLLING A HANDOVER OF A CELLULAR TERMINAL

(75) Inventor: Janne Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 694 days.

(21) Appl. No.: 10/560,079

(22) PCT Filed: Jun. 13, 2003

(86) PCT No.: PCT/FI03/00478
§ 371 (c)(1),
(2), (4) Date: Dec. 8, 2005

(87) PCT Pub. No.: WO2004/112417
PCT Pub. Date: Dec. 23, 2004

(65) Prior Publication Data
US 2006/0234708 A1  Oct. 19, 2006

(51) Int. Cl.
*H04W 36/00* (2009.01)
(52) U.S. Cl. ....... 455/438; 455/3.05; 455/428; 455/436; 455/439; 455/432.1; 370/331
(58) Field of Classification Search .................. 455/438, 455/3.05, 428, 436, 439, 442, 432.1; 370/331
See application file for complete search history.

(56) References Cited

U.S. PATENT DOCUMENTS

| | | | | |
|---|---|---|---|---|
| 5,854,985 A | * | 12/1998 | Sainton et al. | 455/553.1 |
| 6,038,449 A | * | 3/2000 | Corriveau et al. | 455/439 |
| 6,314,082 B1 | | 11/2001 | Malmgren | |
| 6,920,327 B1 | * | 7/2005 | Brandes et al. | 455/452.1 |
| 2003/0002525 A1 | * | 1/2003 | Grilli et al. | 370/465 |

(Continued)

FOREIGN PATENT DOCUMENTS

WO  WO 00/42755  7/2000

(Continued)

OTHER PUBLICATIONS

PCT International Search Report (as published), International Application No. PCT/FI2003/000478, Date of Completion of Search—Dec. 22, 2003.

*Primary Examiner* — Nimesh Patel
(74) *Attorney, Agent, or Firm* — Locke Lord LLP

(57) ABSTRACT

A method, a system and an end-user terminal for providing a handover between a digital unidirectional data communication domain and a digital bi-directional data communication domain is disclosed. Exemplary domains can be a broadcast network such as IP over DVB (Digital Video Broadcasting) network, or a broadcast mode, in further examples IP over DVB-T (Terrestrial DVB) or alternatively referred to as IPDC (IP Datacast), the 3G (The Third Generation for Mobile Communication) network, in further examples UTRAN (UMTS Terrestrial Radio Access Node). The embodiments apply measurement signalling structure of the Inter-system handover of ULMTS (Universal Mobile Telephone System) to control the handover. The measurements of the cell is extended to contain digital unidirectiona communications domain cells such as IP over DVB cells, as well as apply these cells to perform the handover. The fact that one of the network is principally delivering one (unidirectional) leads to a partial handover where the downlink data of the bi-directional network is applied in the handover. The unidirectional communications domain is already in a downlink transmission which knits the handover with the downlink of the bi-directional domain.

26 Claims, 12 Drawing Sheets

U.S. PATENT DOCUMENTS

2004/0028009 A1* 2/2004 Dorenbosch et al. ......... 370/329
2005/0070287 A1* 3/2005 Cave et al. .................... 455/436

FOREIGN PATENT DOCUMENTS

| WO | WO 01/41488 A2 | 6/2001 |
| WO | WO0141488 | 6/2001 |
| WO | WO0203720 | 1/2002 |
| WO | WO 03/045079 A1 | 5/2003 |
| WO | WO03045079 | 5/2003 |

* cited by examiner

METHOD, SYSTEM, NETWORK ENTITY, AND END-USER TERMINAL FOR CONTROLLING A HANDOVER OF A CELLULAR TERMINAL

TECHNICAL FIELD OF THE INVENTION

The invention relates in general to handover in data network systems. In particular, the invention relates to a partial handover.

BACKGROUND OF THE INVENTION

The latest efforts in broadcasting have enabled the delivery of data via digital broadcasting channels. This has opened many new possibilities and created new challenges for such systems and devices because this was not in the traditional implicit nature of broadcasting, like FM radio. A cellular mobile phone with FM radio is already in place. For example, the broadcasting typically, is unidirectional communication in cellular terminal. There are quite many different ways to deliver data information but their inter-operability has not set in place widely. This problem is very inherent when the desired service delivery is not within the reach of the user terminal, or that there would be more attractive delivery ways. Especially the mobile telephones conducting activities that are familiar with computers like video and multimedia type functions, that have increased the need for the delivery of data without any major breaks and further even synchronized delivery between different alternative ways. Especially there are challenges when mobile telephones move from a cell to another cell. Thus, there is a need for techniques providing a flexible delivery of data information.

SUMMARY OF THE INVENTION

Now there has been invented a method, a system, a network element and a end-user terminal for providing a handover between unidirectional and bi-directional mobile services.

In accordance with aspects of the invention there is provided a method, a system, a network element and a end-user terminal for controlling a handover of the terminal between a digital generally bi-directional communications service and a digital generally unidirectional communications service, comprising the steps of:
listening to available downlink radio signals,
selecting according to a predetermined criteria between the available downlink radio signals, and
changing to another available downlink radio signal for at least in part performing said handover.

In various embodiments, the one of the domains is perhaps generally delivering one (generally unidirectional downlink mode) and the partial handover, where the downlink data of the bi-directional network, is perhaps applied in the handover. Thus, in a handover from the generally bi-directional domain to the digital unidirectional data communications domain the handover is partial. The service related to the downlink of the generally bi-directional domain, e.g. the 3G UMTS (Universal Mobile Telephone System) domain is moved to the generally unidirectional domain, e.g. the digital broadcast data communication domain. Also, in a handover from the generally unidirectional domain, e.g. the digital broadcast data communication domain, to the generally bi-directional domain, e.g. cellular mobile data communication domain, the service of the unidirectional data communications domain is handed over to the downlink of the bi-directional data communications domain.

In yet various embodiments, the downlink may perhaps refer to the generally unidirectional data signal communications also, in addition to the downlink of the generally bi-directional data signal communications.

For better understanding of the present invention reference is made to the following description, taken in conjunction with the accompanying drawings, and its scope will be pointed in the appending claims.

BRIEF DESCRIPTION OF THE DRAWINGS

The invention will now be described, by way of example only, with reference to the accompanying drawings, in which.

DETAILED DESCRIPTION OF THE EMBODIMENTS

In the following description of the various embodiments, reference is made to the accompanying drawings which form a part hereof, and in which are shown by way of illustration various embodiments in which the invention may be practiced. It is to be understood that other embodiments may be utilized and structural and functional modifications may be made without departing from the scope of the present invention.

Figure 1:
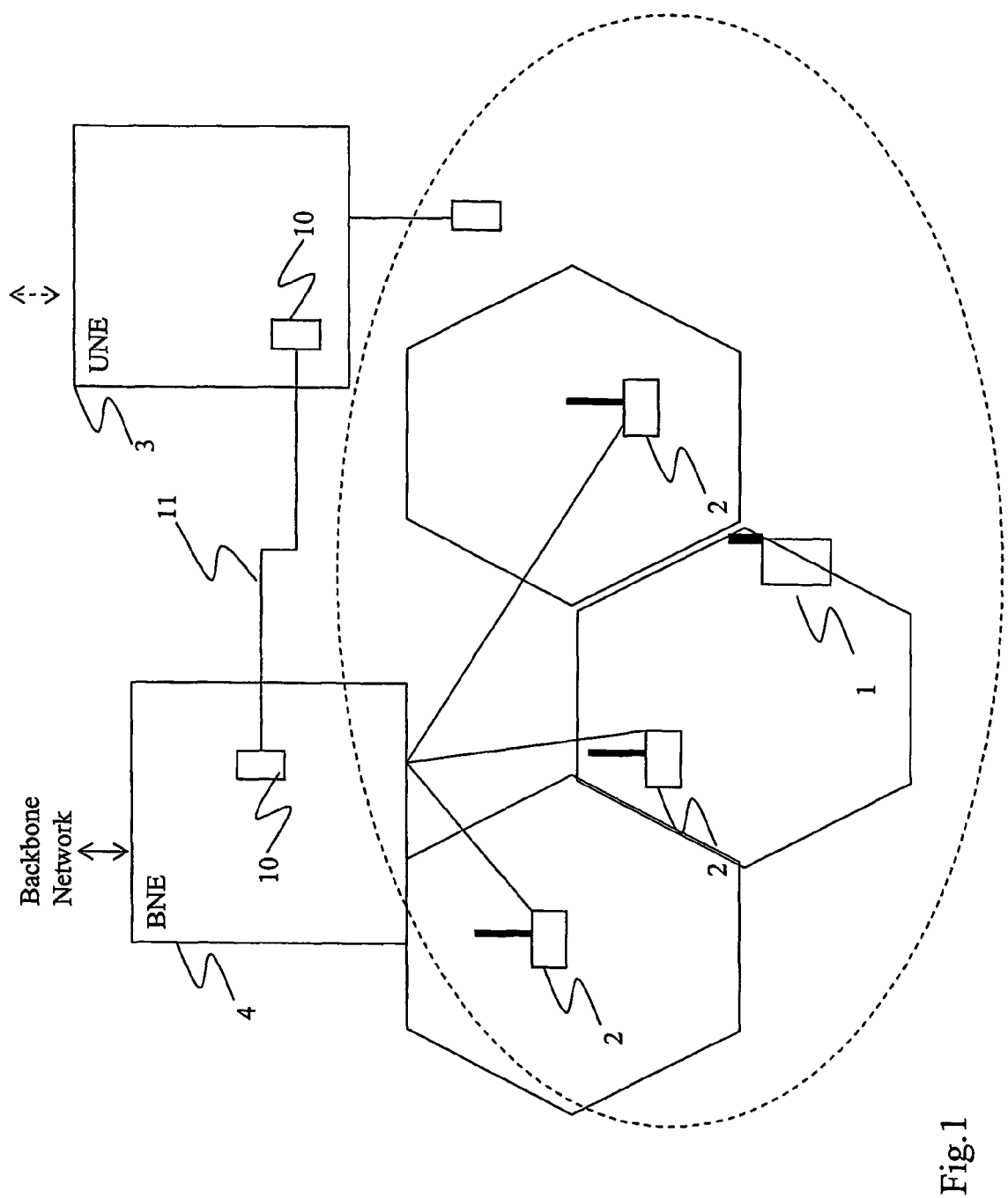
FIG. 1 shows an embodiment of two network systems where the handover is applicable in accordance with the embodiment of the invention.

Referring now to the drawings, wherein like reference numerals refer to like parts, FIG. 1 shows an embodiment of two network systems where the partial handover is applicable. The example of FIG. 1 shows End User Terminal (EUT) 1 being capable of operating under two network systems. It will be understood that other networks or systems may exist or used depending terminal capabilities and available networks. In an embodiment of FIG. 1 a generally bi-directional system such as a UTRAN system has a generally bi-directional network entity (BNE) 4 such as Radio Network Controller (RNC). Typical tasks of the BNE are to at least partly to control and measure the inter-system handover procedure. In some various embodiments, Radio Base Station(s) (BS) 2 with coverage shown as hexagonal areas of respective BS 2 are coupled to BNE 4 providing radio air interface between the EUT 1 and the BS 2. There can be plurality of BSs but for the sake of clarity three are shown. A data channel between the BNE and EUT can be established and the EUT 1 can have IP data based services via BNE 4 such as RNC and BS 2. For example, the EUT 1 can receive data based services at least partly via the downlink. Moreover, there can be controlling and measuring activities such as signals between the BNE 4, BS 2 and EUT 1. Advantageously, the partial handover procedure can be measured and controlled, for example by utilising at least partly the activities therebetween. BNE can have also means for data communication with a backbone network. For example, the service, which EUT 1 obtains via BNE 4, can be transmitted to the BNE 4 from the backbone network. A system of FIG. 1 providing generally unidirectional transmission such as a DVB system has a network entity providing generally unidirectional transmission (UNE) 3 such as a headend (HE) in some examples. In some various embodiments IP over DVB-T is applied in the system. BNE 4 contains a protocol converter 10 for communicating with UNE 3 via a link 11. Alternatively, the link 11 can be arranged via the backbone networks to the digital broadband network and further to UNE 3. Advantageously, the link 11 can convey the control and measurement data information relating to the partial handover between BNE 4 and UNE 3. The link 11 can also convey the data service, for example, if it does not exist in the network system to which the service is handed over. UNE 3 of the network providing unidirectional transmission such as a DVB network contains also the protocol converter 10 for adapting the data communication with BNE 4. Alternatively, the systems of the FIG. 1 can have the conversion in the backbone networks, if, for example, the communication is via the backbone networks between the system. EUT 1 can receive data service transmitted from UNE 3, for example, by IP over DVB-T. It should be noted that UNE 3 has an antenna for transmitting/broadcasting data establishing a broadcast cell, and physical dimensions in the FIG. 1 may not correspond. The FIG. 1 is mainly to depict functionality, operations and structures of the system.

Still referring to the example of FIG. 1, an example of an embodiment of handover procedure occurs from the generally bi-directional domain to the domain providing generally unidirectional transmission. An example of an embodiment handover procedure occurs from UTRAN domain to IPDC domain. Also an example of an embodiment of handover procedure occurs from the domain providing generally unidirectional data transmission to the generally bi-directional data domain. An example of an embodiment handover procedure occurs from IPDC domain to UTRAN domain.

Some embodiments of the invention apply basically two handover scenarios. The scenarios are not limited to the examples given but can be modified. In the following more embodied examples for these handovers are provided.

Some embodiments of a handover from the generally bi-directional domain to the domain providing generally unidirectional transmission.

Figure 2:
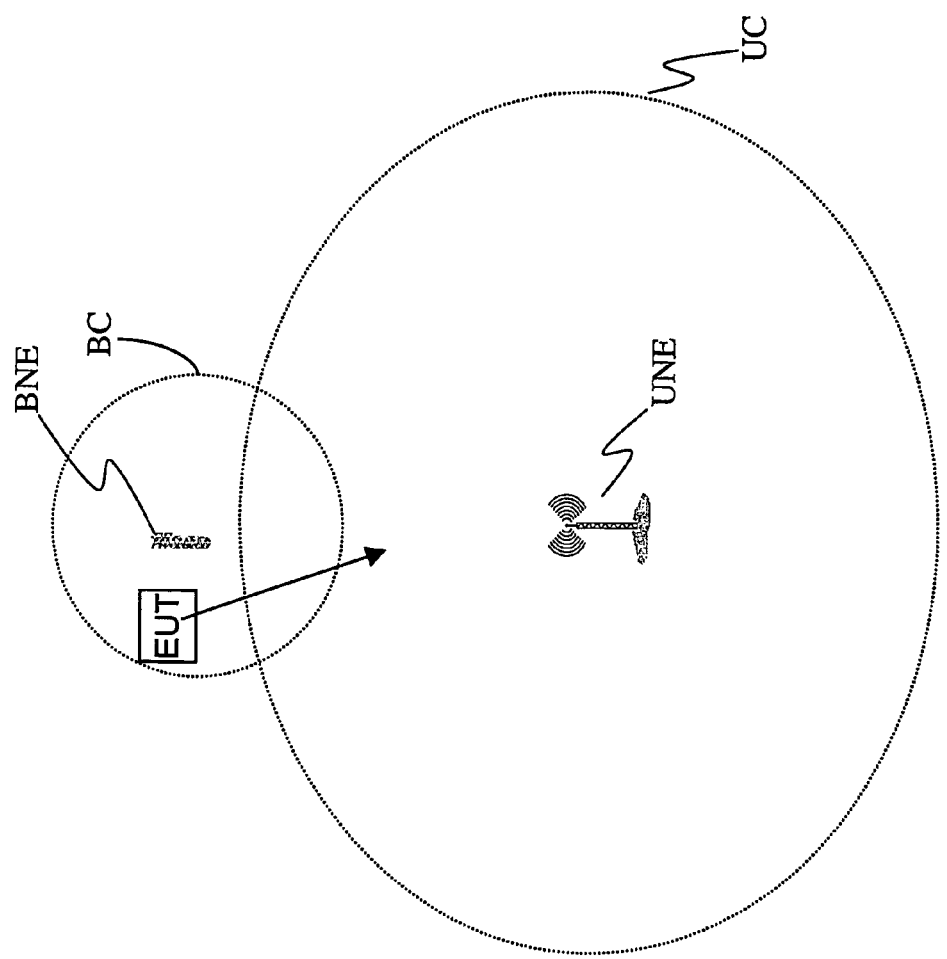
FIG. 2 depicts an example of a handover where end user terminal moves from a bi-directional cell to a cell providing unidirectional transmission and a service is handed over and transferred to the unidirectional based transmission in accordance with an embodiment of the invention.

The example of FIG. 2 depicts a handover where end user terminal moves from bi-directional cell such as UTRAN cell to a cell providing unidirectional transmission such as IPDC cell and service is handed over and transferred to the unidirectional based transmission. Thus, an example of the partial handover from the cellular mobile data communication domain to the broadband data communication domain is provided. Approximate physical cell areas or domains are shown in the FIG. 2 as cells: unidirectional cell (UC) and bi-directional cell (BC). Cells (UC) and (BC) are neighbouring and overlap. This aids in knitting the hybrid system by co-operating the partial inter-system handover between the cells of different systems.

Figure 3:
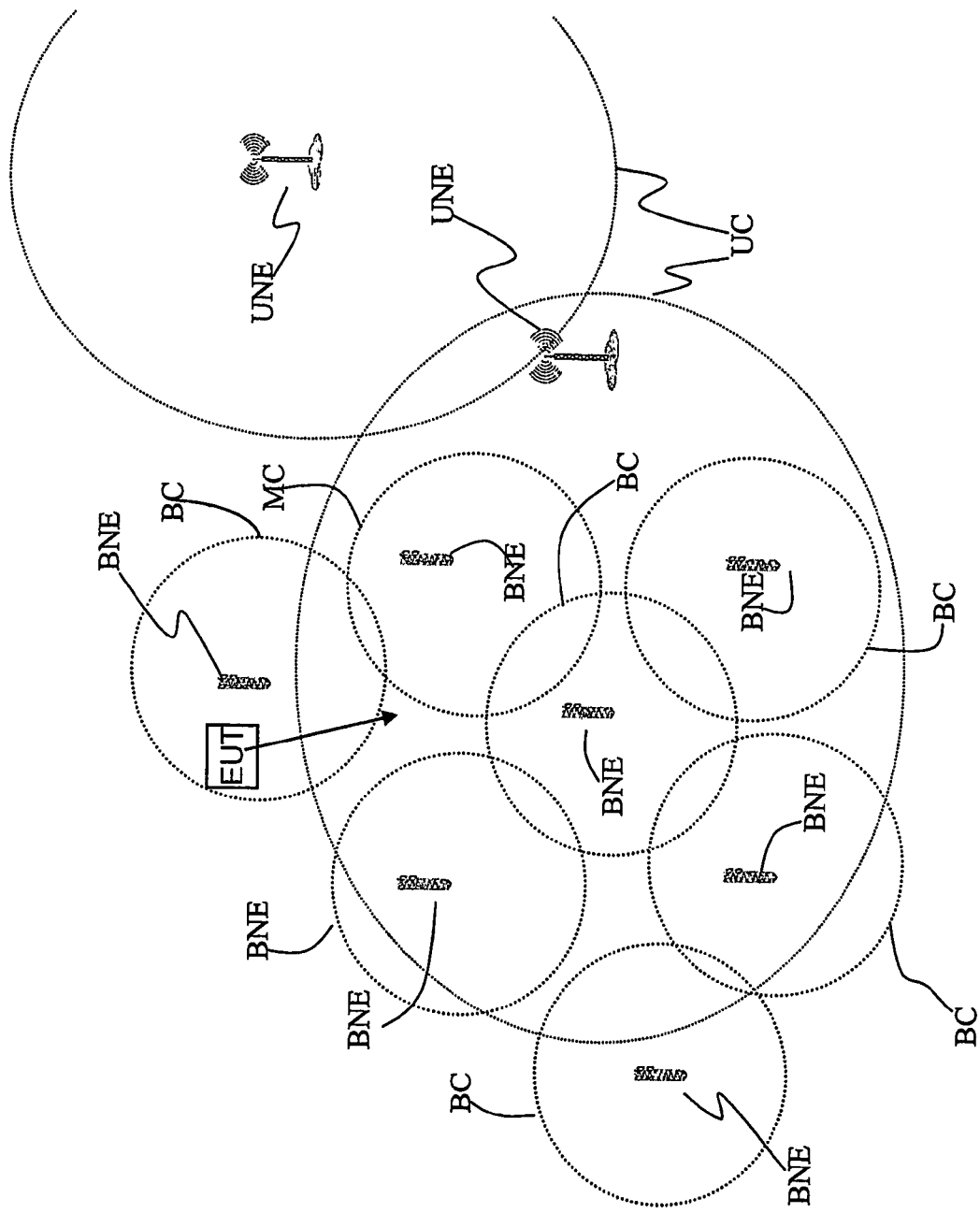
FIG. 3 depicts a further embodiment of the handover where end user terminal moves from a bi-directional network to a network providing unidirectional transmission and service is handed over and transferred to the unidirectional based transmission.

The example of FIG. 3 depicts some further embodiments of the handover scenarios from the bi-directional domain such as UTRAN to the domain providing unidirectional transmission such as IPDC. The bi-directional network such as UTRAN network has many bi-directional cells (BC)s. The BCs can be situated at the same coverage area than the unidirectional cells (BC)s such as IPDC cells. Thus, the cells can overlap, for example, because they can operate at different radio frequencies or use e.g. different coding or time division. The example of FIG. 3 enables that the partial handover between the bi-directional domain and the unidirectional domain can take place at the same coverage area. Thus, this provides other attractive handover basis than just a geographic coverage reason. For example, an economic reason that data delivery would be cheaper in other system than in the currently applied one.

Figure 4:
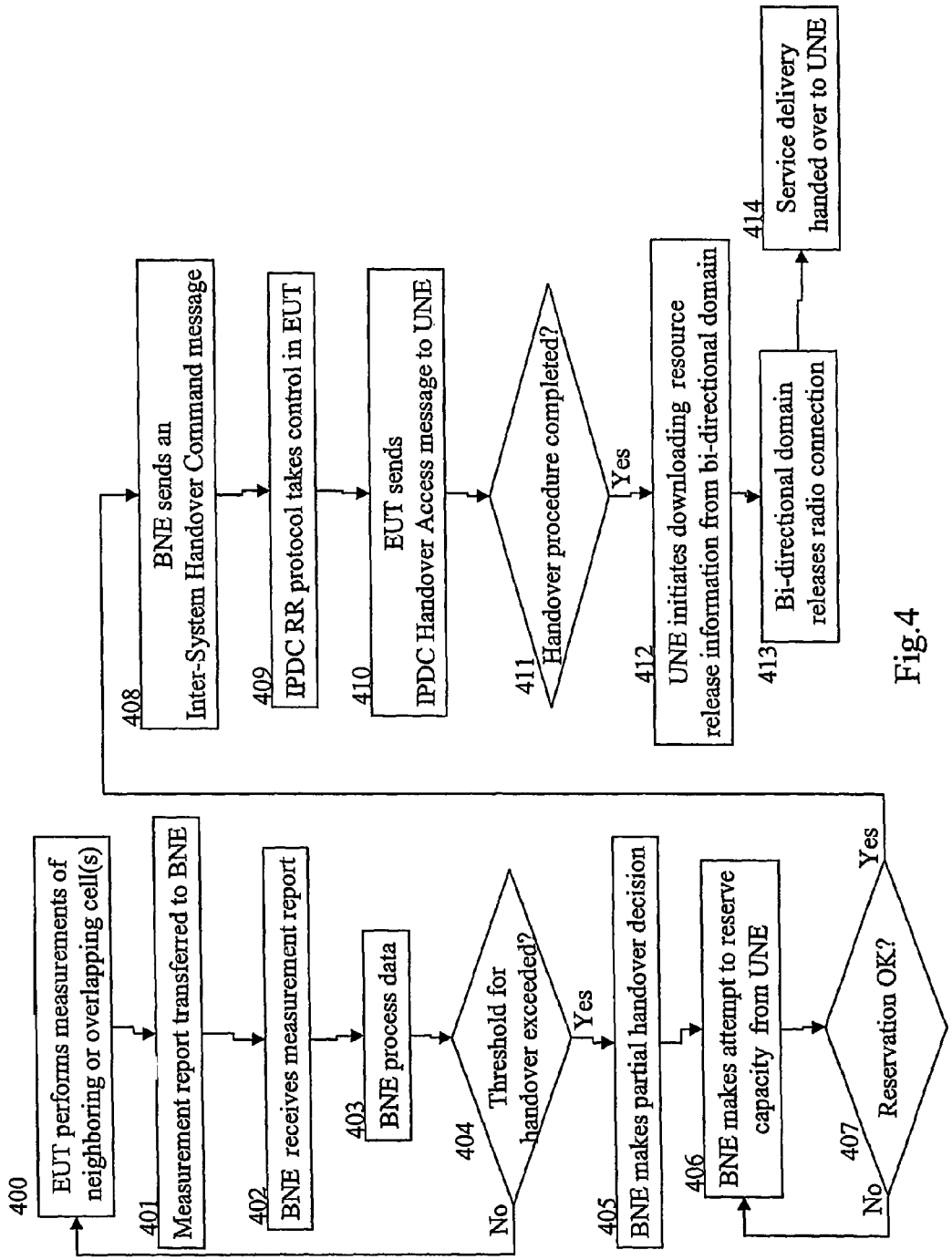
FIG. 4 depicts in a form of a flow chart a method for controlling a partial handover of a service from a bi-directional domain to a domain providing unidirectional transmission in accordance with an embodiment of the invention.

The example of FIG. 4 depicts in a form of a flow chart a method for controlling a partial handover from the generally bi-directional domain such as UTRAN to the unidirectional domain such as IPDC. Referring to the example, the EUT is under the coverage of bi-directional cell (BC) such as UTRAN cell, and within the transmission of the BNE of, e.g. UTRAN. Preferably, the EUT is under coverage of the UTRAN network containing many cells. In step 400 EUT performs measurements of the neighbour or overlapping cell providing unidirectional transmission (UC) such as DVB-T cell. The measurement can relate to downlink radio signals of either or both the bi-directional domain and the unidirectional domain. Advantageously, measurements can be done at any time since the radio interface is different in, e.g. DVB-T and UTRAN. In a further beneficial embodiment, in order to save calculation power in the terminal the measurements could be performed during compressed frames in UTRA FDD (frequency division duplex) mode. Based on the performed measurement the EUT is able to create a measurement report about the neighbour or overlapping unidirectional cell (UC), for example about a broadcast cell, for the partial handover procedure.

In step 401 the measurement report is transferred to the BNE such as the RNC. Preferably, the measurement report contains information on UTRA and IPDC handover procedure situation in respect to the physical location of the BUT in the hybrid network, and conveys this information to RNC. In step 402 BNE receives the measurements report. Preferably, via UTRAN BS. In step 403 BNE process data content of the report for deciding on a need for the partial handover. In a step 404 there is being processed whether a threshold for launching the partial handover process is exceeded. If there is not enough need, for example, the connection remains stable in the applied bi-directional domain such as the UTRAN and no other reasons for the partial handover pops up, the process returns to step 400. It should be noted that the measurement of the EUT is ongoing process as well as the processing of the measurement report. Thus, the exemplary beginning may be replaced by separately running two processes of: 1) providing the measurement data by the EUT and 2) processing the measurement data by the BNE. If the threshold for the partial handover is reached, BNE makes the partial handover decision in step 405.

Referring to FIG. 4, BNE performs an attempt to reserve capacity from the generally unidirectional domain such as IPDC in step 406. Preferably, the reservation relates (only) to downlink data communication capacity of DVB-T cell or DVB-T network since they are principally unidirectional delivery means. For example, data communication via the link 11 takes place between BNE and UNE for exchanging information on the service transmission resources. In step 407 there is being checked whether the reservation attempt succeeds. Preferably, BNE controls the step 407 maintaining quite centralized management for the partial handover. If there are deficiencies, the process returns back to attempting the reservation further to step 406. If there is being detected that enough resources of the unidirectional domain such as IPDC exists, the resources are reserved by BNE from the unidirectional domain. BNE sends an Inter-System Handover Command message to the unidirectional system in step 408. Preferably, the message carries a piggybacked Partial IPDC Handover Command. This contains information required to set up and carry connection to bi-directional cell or network. Approximately at this point in time a certain protocol such as IPDC RR protocol in the EUT takes control in step 409. The protocol launches the EUT to sends a message such as a IPDC Handover Access Message to UNE in step 410. Preferably, this is sent via return channel of IPDC system such as UTRAN. In step 411 there is being checked whether the partial handover procedure can be considered completed. Preferably, the BNE, e.g. the RNC, maintains the hierarchy for controlling the process based on the adjutants unidirectional network, UNE and EUT. If there seem to be deficiencies the process can flexibly return to carry on these or they may be called one by one. If the partial handover procedure can be considered successfully completed, UNE initiates downlink resource release from bi-directional domain in step 412. The bi-directional domain releases the radio connection related to the handover service in step 413. Preferably, UTRAN releases the downlink of the connection related to handed over service. If there is a need for, for example, a control and the uplink of the bi-directional domain remains stable, it can be optionally maintained. The service delivery to EUT is handed over to the UNE in step 414. The unidirectional transmission such as IPDC transmission can continue, for example, broadcasting the service, which was delivered to the EUT via the downlink of the bi-directional domain.

In some embodiments, the other remaining services, for example voice or data, may continue normally in UTRAN. This procedure may focus the partial handover to a dedicated service only if this is considered necessary.

The handover can be considered the partial handover because the downlink of the generally bi-directional transmission (e.g. UTRAN transmission) is handed over to the generally unidirectional transmission (e.g. IPDC). Thus, in the partial handover in some scenarios the service delivered via the downlink of UTRAN can be moved to IPDC transmission bearing in mind that the IPDC is principally aimed for the delivery of services to the EUT.

Generally benefits for a handover from the cellular mobile data communication domain to the broadband data communication domain can be the cheaper and possibly more effective data transmission/service delivery of the broadband system. Also the service can still be within the reach of the user of the EUT. For example, the coverage of the cellular mobile data communication can be weakened or even about the be lost and the broadband data communication domain could still provide the coverage. Typically, the broadband data communication domain provides the EUT with larger cells than the cellular mobile data communication.

Some embodiments of handover of a service from the domain providing generally unidirectional transmission (e.g. IPDC) to the generally bi-directional domain (e.g. UTRAN).

Figure 5:
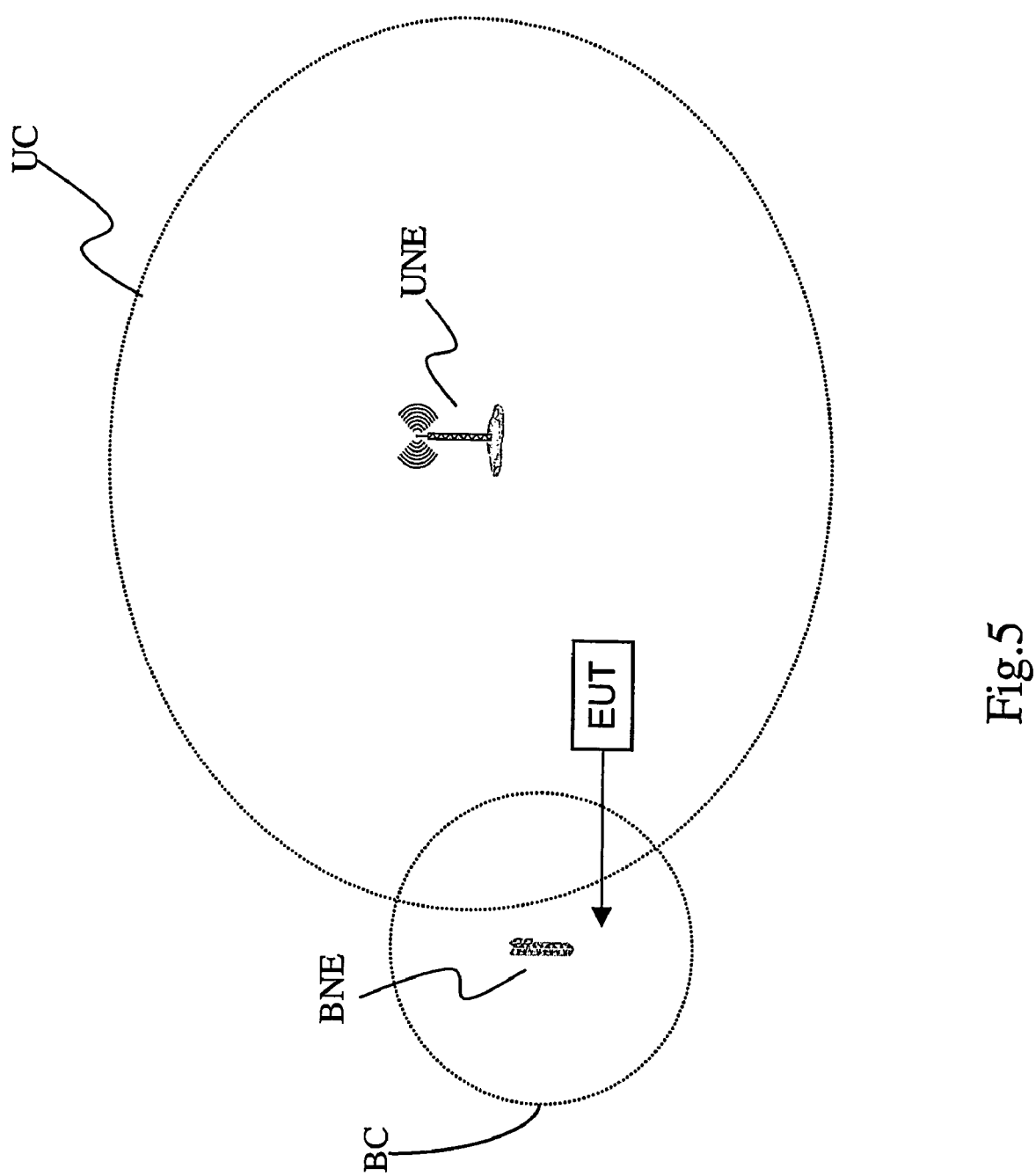
FIG. 5 depicts an example of a handover where end user terminal moves from a cell providing unidirectional transmission to a bi-directional cell and a service is handed over and transferred to the bi-directional based downlink transmission in accordance with an embodiment of the invention.

The example of FIG. 5 depicts a handover where EUT moves from a generally unidirectional cell to a generally bi-directional cell and a service is handed over and transferred to the bi-directional based downlink transmission. Thus, an example of the partial handover from the broadband data communication domain to the cellular mobile data communication domain is provided. Approximate physical area or domains are shown in the FIG. 5 as cells (UC) and (BC). Cells (UC) and (BC) are neighbouring and overlap. This aid in knitting the hybrid system by co-operating the partial inter-system handover between the cells of different systems.

Figure 6:
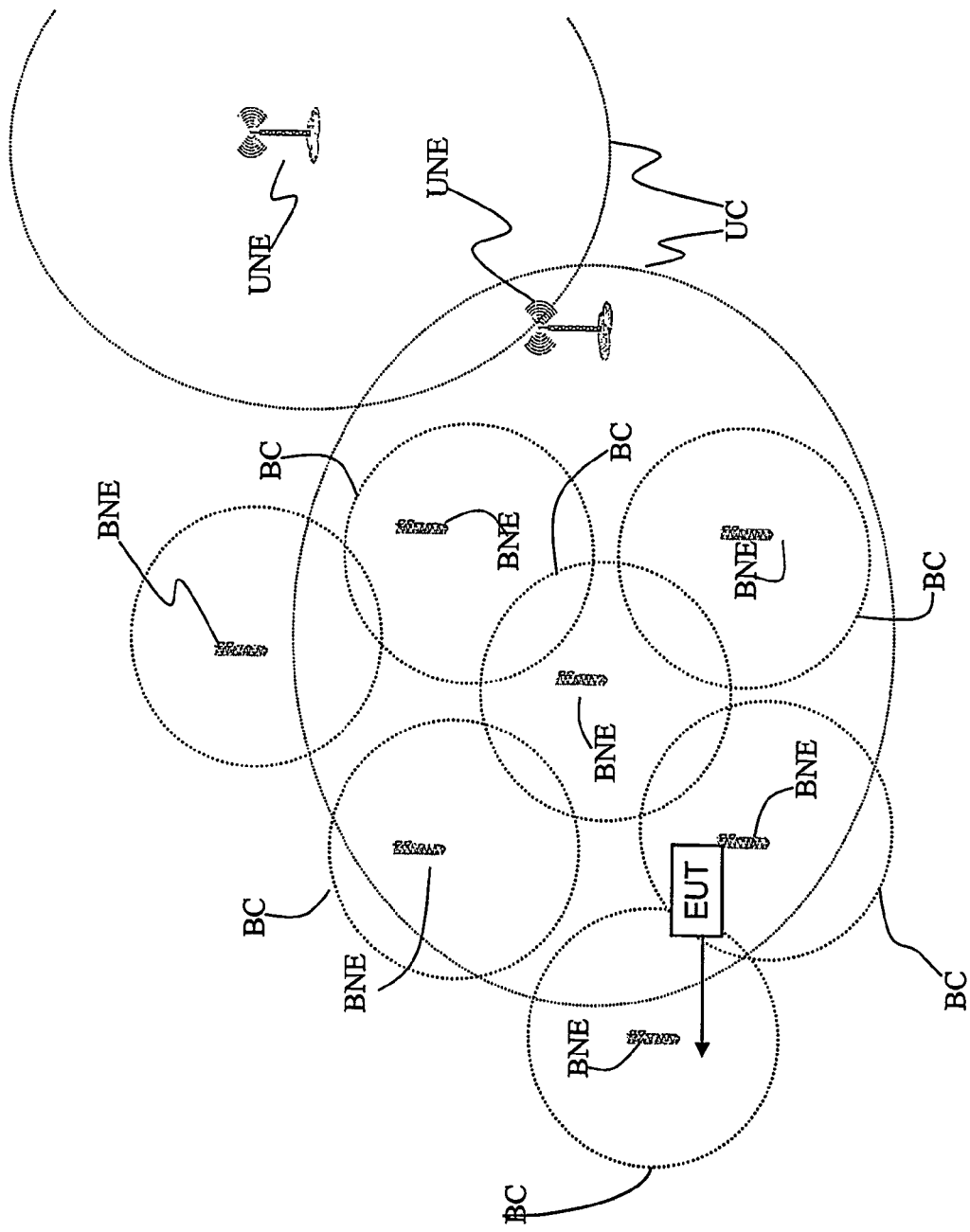
FIG. 6 depicts a further embodiment of the handover where end user terminal moves from a network providing unidirectional transmission to a bi-directional network and the service is handed over and transferred to the bi-directional based transmission.

The example of FIG. 6 depicts a further embodiment of the handover from the domain providing generally unidirectional transmission to the generally bi-directional domain. The bi-directional network has many bi-directional cells (BC)s. For example, the UTRAN network has many UTRAN cells. The BCs can be situated at the same coverage area than the unidirectional cells (UC)s. Thus, the cells can overlap because they can operate at different radio frequencies, apply different coding or time division. The example of FIG. 6 enables that the partial handover between the generally bi-directional domain such as UTRAN and the generally unidirectional domain such as IPDC can take place at the same coverage area. Thus, this provides other attractive handover basis than just a geographic coverage reason. For example, an economic reason that data delivery would be cheaper in other system than in the currently applied one.

Figure 7:
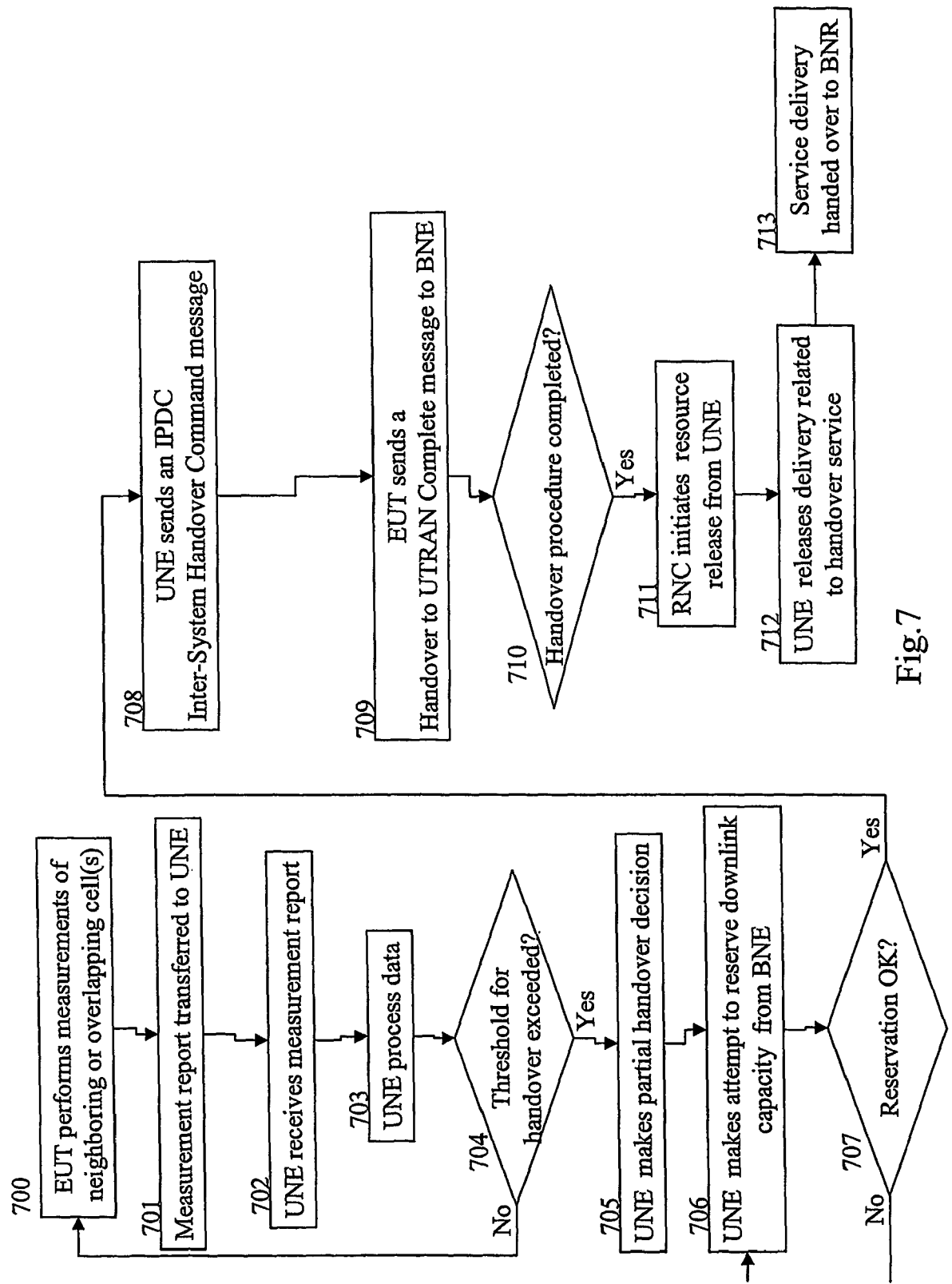
FIG. 7 depicts in a form of a flow chart a method for controlling a partial handover from a domain providing unidirectional transmission to a bi-directional domain in accordance with an embodiment of the invention.

The example of FIG. 7 depicts in a form of a flow chart a method for controlling a partial handover from the domain providing generally unidirectional communications such as the IPDC to the domain providing generally bi-directional communications such as the UTRAN. Referring to the example, the EUT is under the coverage of the cell providing generally unidirectional transmission (UC), which is an example of a broadband cell such as IPDC cell. So the EUT can perhaps be under within the transmission of the UNE of, e.g. IPDC. Preferably, the EUT is under coverage of IPDC network containing many broadcast cells. In step 700 EUT performs measurements of neighbouring or overlapping cell(s) providing generally bi-directional transmission. In various embodiments, the measurement can relate to downlink radio signals of UTRAN. Advantageously, these measurements can be performed flexibly since the radio interface of the unidirectional domain e.g. IPDC and the bi-directional domain, e.g. UTRAN are different from each other, and the systems do not effectively interfere each other. Based on the performed measurement the EUT is able to create a measurement report about the neighbouring or overlapping bi-directional cell(s) (BC) for the partial handover procedure.

In step 701 the measurement report is transferred from EUT to HE. EUT reports the measurements to the UNE. Preferably, this is sent via return channel of DVB-T system such as UTRAN. Moreover preferably, the measurement report contains information on UTRAN and IPDC handover procedure situation in respect of the physical location of the EUT in the hybrid network, and conveys this information to UNE. For example, radio signal strengths in the data communication between BUT with UNE and/or with UTRAN. In step 702 UNE receives the measurement report. Preferably, the measurement report is conveyed via UTRAN. In step 703 UNE process data content of the report for deciding on a need for the partial handover. In step 704 there is being processed whether a threshold for launching the partial handover process is exceeded. If there is not enough need (for example, the connection remains stable in the applied IPDC based service delivery and/or no other reasons for the partial handover pops up), the process returns to step 700. It should be noted that the measurement of EUT data reception is preferably an ongoing process as well as the processing of the measurement report. Thus, the exemplary beginning may be replaced by separately running two processes of providing the measurement data by EUT and processing the measurement data by UNE/BNE. If the threshold for the partial handover is reached, UNE makes the partial handover decision in step 705.

Referring to FIG. 7, after receiving the measurement report from EUT in IPDC mode, preferably including UTRAN measurements, and IPDC measurements and after making a handover decision, HE initiates resource reservation from UTRAN RNC in step 706. HE performs the attempt to reserve capacity from UTRAN. Preferably, the reservation relates (only) to downlink data communication capacity of UTRAN cell or UTRAN network since IPDC has principally unidirectional service delivery. For example, data communication via the link 11 takes place between RNC and HE for exchanging information on the service transmission resources. In step 707 there is being checked whether the reservation attempt succeeds. Preferably, HE controls the step 707 maintaining quite centralized management for the partial handover. If there are deficiencies, the process returns back to attempting the reservation further to step 706. If there is being detected that enough resources of the bi-directional domain exists, the resources are reserved by UNE from the bi-directional domain. UNE sends a message such as an Inter-System Handover Command message to the bi-directonal system such as the UTRAN system in step 708. Preferably, the message carries a piggybacked UMTS Handover to UTRAN from IPDC Command message. This contains information required to set up and carry connection to UTRAN cell or network. EUT completes the handover procedure with a handover to UTRAN Complete message which is transmitted to BNE in step 709. In step 710 there is being checked whether the partial handover procedure can be considered completed. Preferably, UNE maintains the hierarchy for controlling the process based on the adjutants BNE and EUT. If there seem to be deficiencies, the process can flexibly return to carry on these tasks or they may be called one by one. If the partial handover procedure can be considered successfully completed, BNE initiates resource release from the generally unidirectional domain in step 711. The unidirectional domain releases the radio connection related to the handover service in step 712. Preferably, IPDC releases the broadcast connection related to the handed over service. The service delivery to EUT is handed over to BNE in step 713. The bi-directional domain such as the UTRAN can continue transmitting the service, which was delivered to the EUT via the broadband transmission of the generally unidirectional domain.

The examples of some handover procedures can be applied for a service handover from a non-UTRAN system, for example IPDC, to UTRAN. Thus, yet another example of the inter-system handover from the broadband data communication domain to the cellular mobile data communication domain is provided. In a further embodiment for GSM case, dual or several mode EUT receives the UTRAN neighbour cell parameters on GSM System Information messages. This is not so critical in UTRAN example, since there is a connection via UTRAN all the time active and there is no need for this.

The embodied handover can also be considered the partial handover in such a way that it is related to the service transmitted by generally unidirectional transmission and the downlink of the generally bi-directional transmission. Thus, the handover can be considered the partial handover because service transmitted via typically unidirectional broadband transmission is handed over to the downlink data transmission of the bi-directional transmission.

Generally benefits for a handover from the broadband data communication domain to the cellular mobile data communication domain can be that the service can still be within the reach of the user of the EUT. For example, the coverage of the broadband data communication can be weakened or even about the be lost, and the cellular mobile data communication domain could still provide the coverage and applicable connection. Generally this kind of scenario enables IPDC based service to follow the end user everywhere, where there exists the hybrid system, seamlessly. Another benefit in an embodiment may be to make a handover decision to the generally bi-directional domain if the QoS or C/I is not good enough in the cell providing generally unidirectional transmission and if there is room in the bi-directional domain for delivering the service. If this is the case, the service will be transferred/handed over to the downlink of the generally bi-directional domain, e.g. downlink of UTRAN.

Figure 8:
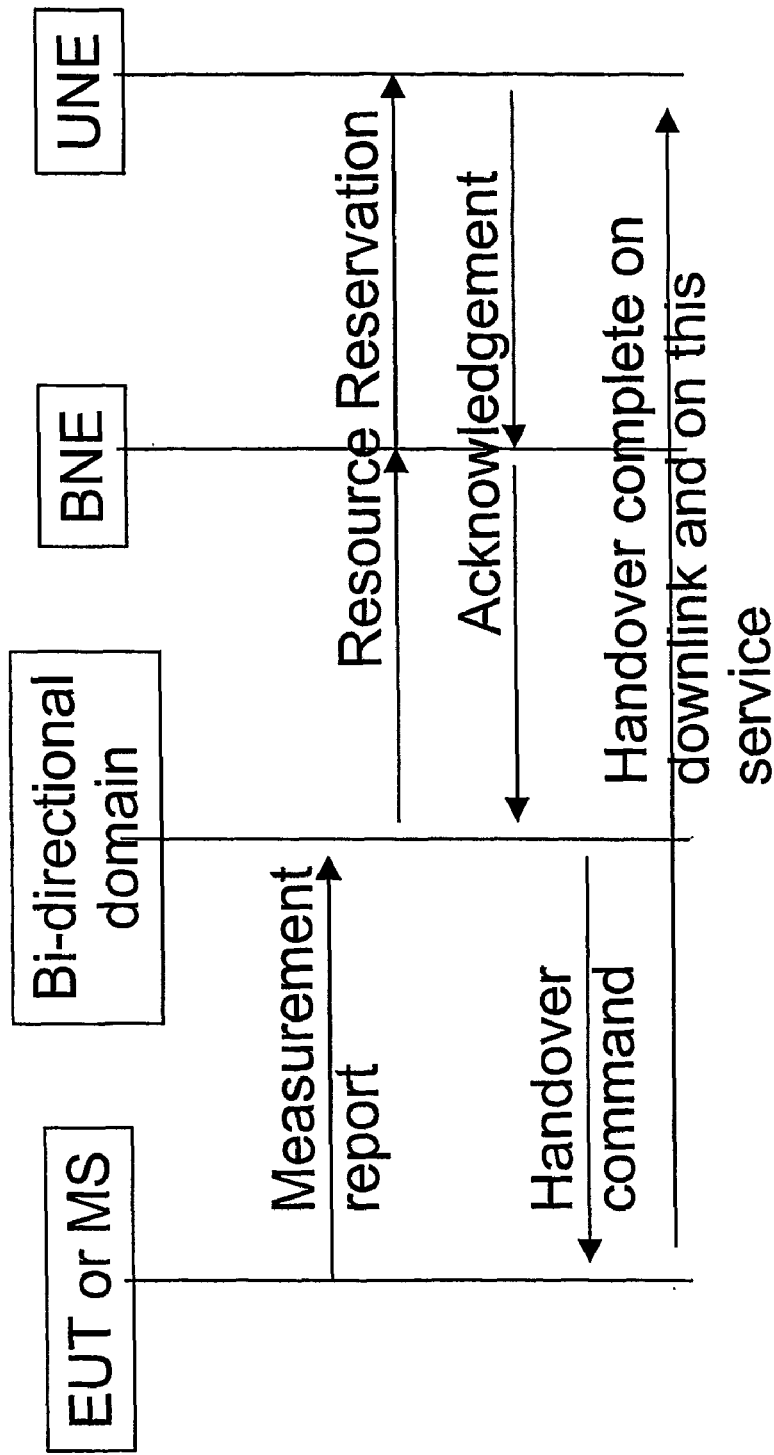
FIG. 8 depicts in a form of a signalling diagram messages and signals between EUT, bi-directional domain, BNE and UNE when performing handover from bi-directional domain to a domain providing unidirectional transmission in accordance with an embodiment of the invention.

The example of FIG. 8 depicts in a form of a signalling diagram messages and signals between EUT, the bi-directional domain such as UTRAN, BNE, and UNE such as IPDC HE when performing handover from the bi-directional domain to the unidirectional domain. Thus, yet another example of the partial handover from the cellular mobile data communication domain to the broadband data communication domain is provided. The signal communication relating to an embodied scenario about partial handover procedure can begin with the measurement report signalling. The EUT sends the measurement report signal(s) to the bi-directional domain. Preferably, UTRAN RNC receives the measurement report from EUT. The measurement report signalling applied wireless cellular mobile data communications. The BNE of, e.g. UTRAN initiates the resource reservation process for the handover and the BNE sends resource reservation signalling. The resource reservation signalling is preferably send to UNE (e.g. IPDC BS) and, in some embodiments via MSC of the cellular mobile network. UNE acknowledge the reservation request by sending acknowledgement signalling to the bi-directional network, preferably UTRAN via MSC. The data communication between the bi-directional network and UNE can take place via the link 11 of FIG. 1. The UNE may also send negative acknowledgement in case there is not enough resources for the service delivery in the IPDC. When the bi-directional network has received the acknowledgement signalling, the bi-directional domain realises that the unidirectional domain has enough available data delivery resources for handing over the service, which is delivered via the bi-directional network, to be broadcast via, e.g. IPDC. The bi-directional network sends the handover command to EUT. Preferably, the handover command relates only for a service and for that only the downlink of the bi-directional network. It should be noted that the broadcasting IPDC can offer the principally unidirectional service delivery. Also all other traffic may continue on the bi-directional network despite the handover. EUT completes the handover procedure for the downlink and for a certain service.

Figure 9:
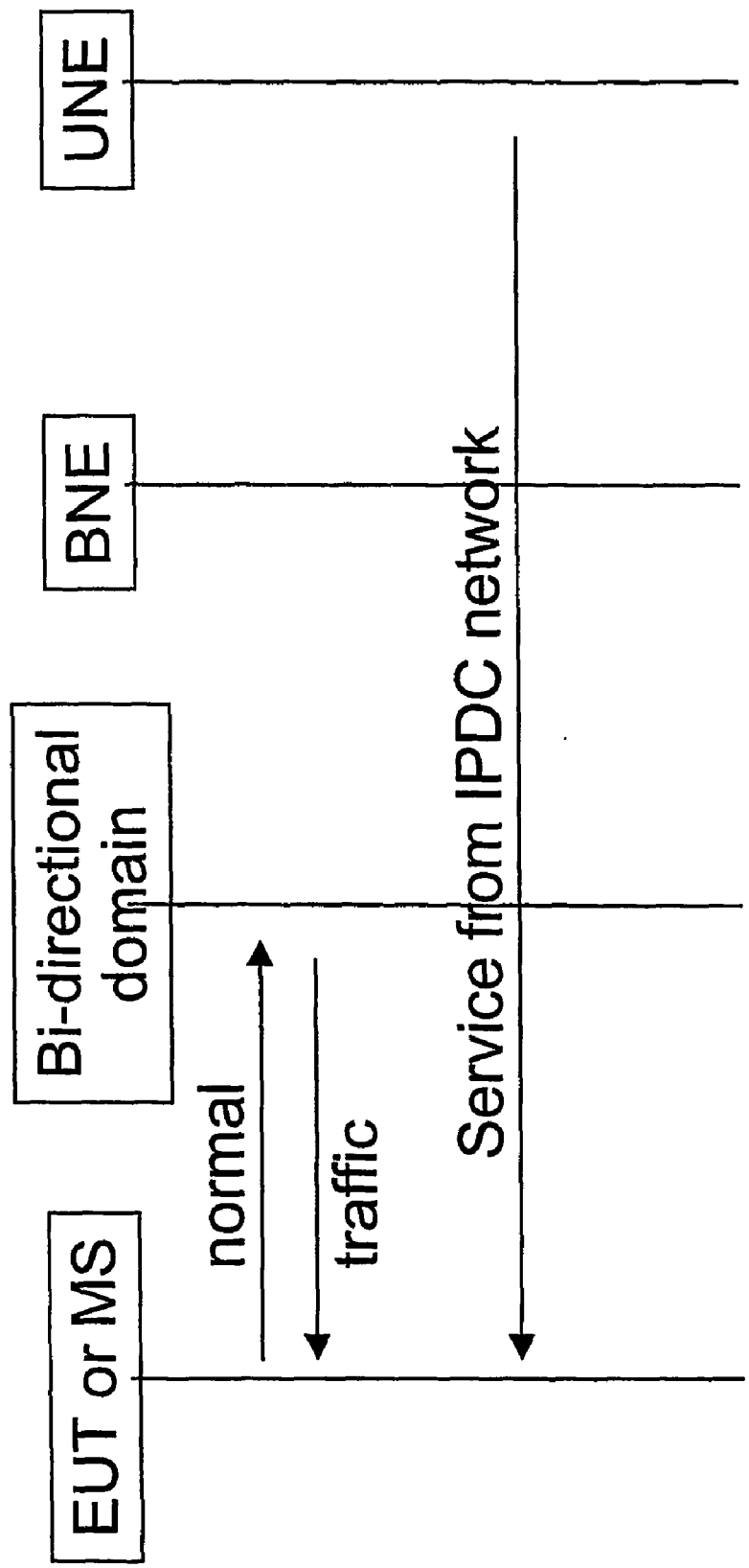
FIG. 9 shows an embodied example of a static status when the handover has been performed and the service is coming from a domain providing unidirectional transmission.

The example of FIG. 9 shows a static status when the handover has been made and the service is coming from IPDC. It should be noted that that any other traffic may continue on UTRAN despite the handover has been performed. The service delivery to EUT is from IPDC, preferably via a certain applicable HE.

Figure 10:
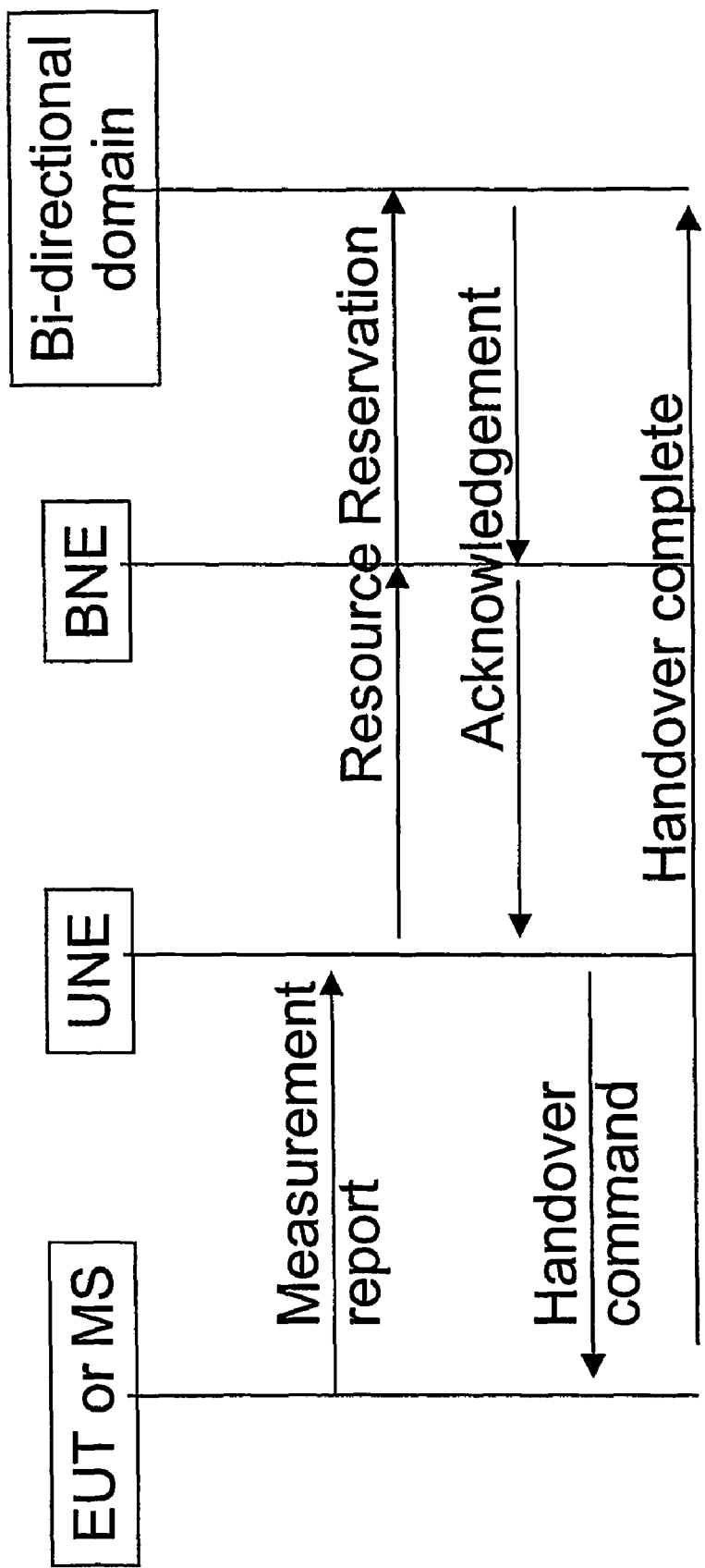
FIG. 10 depicts in a form of a signalling diagram messages and signals between EUT, UNE, BNE and UTRAN when performing handover from the domain providing unidirectional data transmission to the bi-directional data domain in accordance with an embodiment of the invention.

The example of FIG. 10 depicts in a form of a signalling diagram messages and signals between EUT, UNE and the bi-directional domain when performing handover of a service from the unidirectional domain to the bi-directional domain. Thus, yet another example of the inter-system handover from the broadband data communication domain to the cellular mobile data communication domain is provided. The signal communication relating to an embodied partial handover procedure can begin with the measurement report signalling. EUT sends the measurement report signal(s) to UNE. Preferably, the signalling connection between EUT and the bi-directional domain is functionally active principally all the time. EUT can transmit the signalling to UNE, for example, via UTRAN return channel. UNE receives the report signalling and initiates the resource reservation for the partial handover from the bi-directional domain. UNE sends the resource reservation signalling to the bi-directional domain, preferably, via MSC. Preferably, UTRAN RNC receives the signalling. The bi-directional domain checks for the available resource. The bi-directional network sends an acknowledgement to UNE if there is enough available resource for the partial handover. The acknowledgement is preferably sent via MSC. The UTRAN may also send negative acknowledgement in case there is not enough resources for the service delivery in the UTRAN. UNE receives the acknowledgement and obtains the confirmation to proceed with the handover. UNE sends the handover command to EUT. The handover command launches the EUT to move to a different system i.e. to UTRAN. The handover command is preferably wirelessly broadcast to EUT via DVB-T transmission. EUT completes the handover for the downlink and for a certain service. Advantageously, the partial handover enables to drop UNE (such as IPDC BS) off completely if this can be seen necessary.

Figure 11:
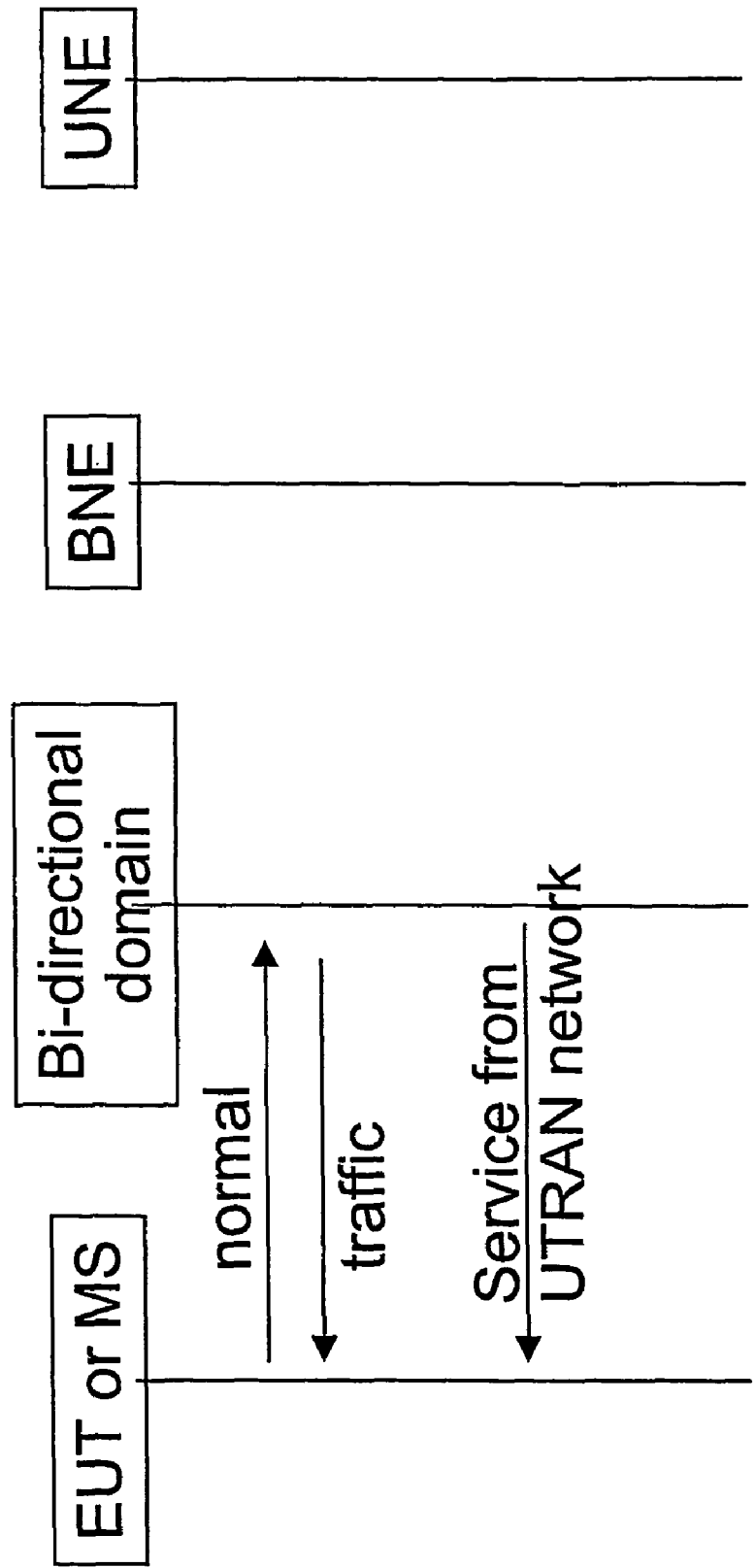
FIG. 11 shows an embodied example of a static status when the handover has been performed and the service is coming from bi-directional domain.

The example of FIG. 11 shows a static status when the handover has been made and the service is coming from the downlink of the bi-directional network such as 3G. It should be noted that any other traffic may continue on the bi-directional network despite the handover has been performed. Thus, there can be some data communication between EUT and the bi-directional network. The service delivery to, EUT is from UTRAN, preferably via a certain applicable cell. Advantageously, UNE may be dropped off completely, thereby saving some delivery resources.

Figure 12:
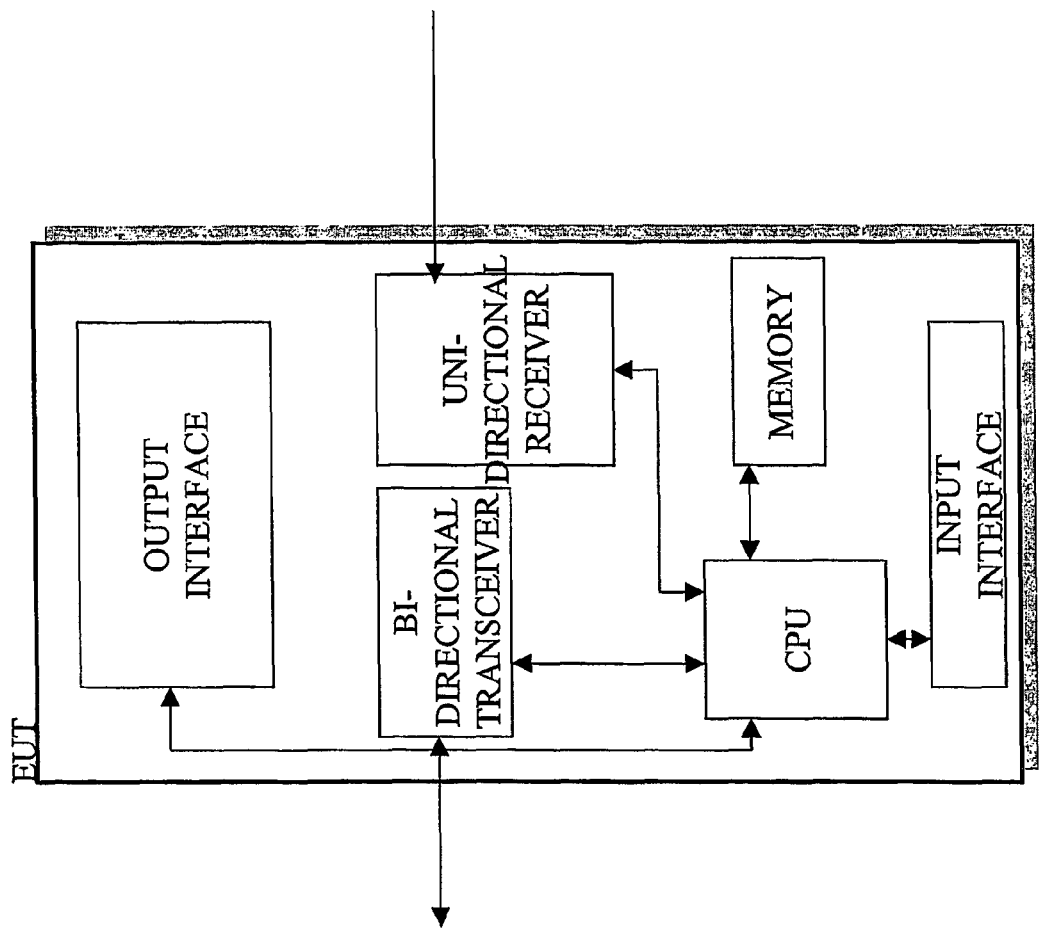
FIG. 12 depicts an example of a functional block diagram of End User Terminal (EUT) for receiving the service, which is partially handed over between the unidirectional domain and bi-directional domain.

The example of FIG. 12 embodies a functional block diagram of End User Terminal (EUT) for receiving the service, which is partially handed over between the bi-directional domain and the unidirectional domain. EUT of FIG. 12 may be used in any/all of the above example(s). EUT comprises a processing unit CPU, a broadband receiver part or alternatively referred to as a multi-carrier signal receiver part or IP over DVB-T receiver part, which can receive, for example, a multi-carrier broadband signal such as DVB-T signal, and a user interface (UI). The broadband receiver part and UI are coupled with CPU. UI comprises a display and a keyboard to enable a user to use the receiver. In addition, UI comprises a microphone and a speaker for receiving and producing audio signals. UI may also comprise voice recognition (not shown). EUT has also a cellular mobile transceiver which is also coupled with CPU. CPU comprises a microprocessor (not shown), memory and possibly software SW (not shown). SW can be stored in the memory. The microprocessor controls, on the basis of SW, the operation of the receiver, such as receiving of service either via the cellular mobile transceiver or via the broadband receiver, reception and transmission of the handover related signals/messages, processing of the handover confirmation, establishing the measurement report, measuring the signalling connection between EUT and UTRAN, measuring the signalling connection from IPDC to EUT. The operations are described in the examples of FIG. 1-11. For example, hardware (not shown) comprises means for receiving of service either via the cellular mobile transceiver or via the broadband receiver, means for receiving and transmitting the handover related signals/messages, means for processing the handover confirmation, means for establishing the measurement report, means for measuring the signalling connection between EUT and the bi-directional domain, means for measuring the signalling connection from the unidirectional domain to EUT. Preferably, EUT is a wireless terminal being capable of receiving wireless multi-carrier signal transmission (typically broadcast) of the digital broadband communication domain, and also receiving and the downlink wireless signal transmission of the cellular mobile communication domain. Preferably, EUT can wirelessly transmit signal to the cellular mobile communication domain.

Still referring to FIG. 12, alternatively middleware or software implementation can be applied (not shown). EUT can be a hand-held device which the user can comfortably carry or care. Advantageously, EUT can be a cellular mobile phone which comprises the broadband receiver part for receiving DVB-T broadband transmission. EUT may possibly interact with UNE via cellular mobile based UTRAN. Also, the mobile phone can advantageously, receive UTRAN based service via the downlink of the cell.

Some embodiments of the invention provide a method, a system, a network element and a end-user terminal for providing a handover between a generally unidirectional service delivered by the digital broadband data communication domain and a generally bi-directional service by the cellular mobile data communication domain. Preferably, the digital broadband data communication domain can be a broadcast network such as IP (Internet Protocol) over DVB (Digital Video Broadcasting) network, in further examples IP over DVB-T (Terrestrial DVB) or alternatively a IPDC (IP Datacast). Also the downlink of the 3G or like can be the unidirectional broadband communications in some embodiments. The cellular mobile data communication network can, preferably, be the 3G (The Third Generation for Mobile Communication) network, in further examples UTRAN. The digital broadband network can be other unidirectional cellular network which can broadcast digital data information or a service which is unidirectionally served to the terminal. The preferred embodiments apply measurement signalling structure of the Inter-system handover of UMTS to control the handover. The measurements of the cell is extended to contain digital broadband communication domain cells such as IP over DVB cells, as well as apply these cells to perform the handover. The fact that one of the network is principally delivering one (unidirectional) leads to a partial handover where the downlink data of the bi-directional network is applied in the handover. Thus, in a handover from the generally bi-directional domain to the digital unidirectional data communications domain the handover is partial. The service related to the downlink of the generally bi-directional domain, e.g. the 3G UMTS (Universal Mobile Telephone System) domain is moved to the generally unidirectional domain, e.g. the digital broadband data communication domain. Also, in a handover from the generally unidirectional domain, e.g. the digital broadband data communication domain, to the generally bi-directional domain, e.g. cellular mobile data communication domain, the service of the unidirectional data communications domain is handed over to the downlink of the bi-directional data communications domain.

The digital unidirectional data communications domain perhaps offers a high bandwidth broadband transmission channel wherein delivery is typically broadcast, multicast, or alternatively unicast. The high bandwidth transmission channel can offer a user of such system various services. IP data over DVB network is applied offering applicable data transmission principles. Preferably, IP data over a Terrestrial Digital Video Broadcasting (DVB-T) network is applied. This can be referred to as IPDC also. Thus, as used herein, transmission of IPDC may refer to a broadcast, multicast, or unicast, and data can include but is not limited to, IP protocol-encoded data. Network of DVB-T system contains cells that participate to the handover procedure with the cells of the other system. The appliance of the digital broadband data communication domain as a co-operative system boosts the benefits of the invention such as economy. For example, DVB-T offers an effective and cheap way to distribute data, and the embodiments of the invention benefit this by mending the broadband domain within the reach of the UMTS domain. Preferably, the digital broadband communication domain transmits a wireless multi-carrier signal adapted to, i.e. DVB-T. It should be noted that a broadcast mode of 3G and/or GPRS can serve and operate as the unidirectional broadband data communications domain as well.

Thus, in various embodiments of the invention the IP Datacast (IPDC) is perhaps applied. IPDC refers to unidirectional data communication over digital broadcast networks. Technically it can be implemented by sending IP over for example DVB-T radio technology. Furthermore, IPDC can be implemented by using several different radio technologies like DVB-T, DVB-S, DVB-X, DAB, ISDB-T, ATSC, DRM, FM, etc. In addition to digital broadcast technologies, it should be noted that IPDC can be implemented as well using a broadcast mode of 3G and/or GPRS. Thus, IPDC is not limited to the example of broadcasting such as DVB but may relate to other applicable broadband or broadcast network being perhaps capable of basically unidirectional data communications. The downlink may perhaps refer to unidirectional data signal transmission.

On the other hand the bi-directional domain such as the cellular mobile data communications offers a two-way data communication channel with sometimes, but necessary always, a bit more limited rate to transfers data. IP data has been applicable in the cellular mobile domain, and, preferably UTRAN is applied in the embodied invention. As an example of UTRAN WCDMA network offers an applicable solution. A nature of such systems is that they contain and are based on cells. Thus, a basic architecture for handover procedure is laid down in such a system. The embodied invention apply measurement signalling structure of such system such as the Inter-system handover of UMTS (Universal Mobile Telephone System) to control the handover between the broadband domain network. As the cellular mobile data communication domain is clearly bi-directional or two-way communication system, and the broadband domain has the history of focusing functionally to unidirectionally deliver data to the End User Terminal (EUT), it is beneficial to focus on the downlink data communication of the cellular mobile data communication. Thus, this can be referred to as the partial handover because in respect of the handed over service it relates to the downlink of data communication of the cellular mobile data communication such as the downlink of UMTS. For measurement and commanding purposes the two-way data communication can be beneficially applied to control and deliver the handover procedure with the cellular mobile data communication domain. Preferably, the cellular mobile data communication domain transmits wireless signal. The generally bi-directional network can have the bi-directional network element (BNE).

Advantageously, the embodied invention uses native network level signalling enabling application independent handover from/to cellular mobile data domain such as the 3G or UMTS network to/from digital broadband network such as IPDC network.

A hybrid network systems typically contains at least two different network systems, and it is highly important, in order to get more benefit of the hybrid solution, that they co-operate. An example of the hybrid network system can be the digital broadband network such as DVB-T network containing IPDC feature and a 3G network such as WCDMA based UTRAN.

In some embodiments of the hybrid network systems, the channel system model can, for example be based on the following examples. In the channel system model, two channels are perhaps established between the service provider and the user: for example, broadcast channel and interaction channel.

broadcast channel: A unidirectional broadband broadcast channel including video, audio and data also referred to in some embodiments. The broadcast channel can be established from the service provider to the users. It may include the forward interaction path. The broadcast channel may be referred to as downstream channel also.

interaction channel: A bi-directional interaction channel is established between the service provider and the user for interaction purposes in some examples. It can be formed by:

Return interaction path (return channel): This can perhaps be from the user to the service provider. It can be used to make requests to the service provider or to answer questions. It can also be a narrower band channel. Sometimes referred to as return channel perhaps.

Forward interaction path: This can be from the service provider to the user. It may be used to provide some sort of information by the service provider to the user and any other required communication for the interactive service provision perhaps. It may be embedded into the broadcast channel. It is possible that this channel is not required in some simple implementations which make use of the broadcast channel for the carriage of data to the user. The forward interaction path may also be the downstream traffic as actually, in some embodiments, no interaction is necessary needed or used: For example, some UTRAN downlink data services.

Some embodiments of the invention apply a unidirectional cell (UC) also alternatively referred to as a digital broadband cell or broadcast cell. In some examples the broadcast cell can be a geographical area that is covered with DVB-T signal by means of one or more transmitters each radiating at least one particular transport stream on a certain frequency. Sometimes, a particular transport stream on only one frequency is applied in the unidirectional cell (UC). The broadcast cell may in addition contain repeaters. Two neighbouring broadcast cells may have an intersection. The cell_id that is used to uniquely identify a cell can be unique within each original_network_id. The broadcast cell may have sub-cells having different operation frequencies. Preferably, the broadcast cell contains a Transport Stream (TS) delivering one or more services to the receiver. It should be noted that also, for example, a cell of basically bi-directional cell acting in a broadcast mode can provide the transmission equivalent to the unidirectional cell.

Some embodiments of the invention apply a headend (HE). The headend (HE) equipment provides means for broadcasting the transport stream within the broadcast cell. Moreover, the headend may deliver the TS in other broadcasting environment such as cable and satellite. Typically, an operator of the broadcast network operates the headend. Alternatively the headend can be referred to as a broadcast Base Station (BS) or IPDC BS. The heandend can be an example of the unidirectional network entity (UNE). UNE can be a networking element of the generally unidirecitonal network.

Some embodiments of the invention apply the handover. In some alternative expressions, the handover can be referred to as handoff. It should be noted that both expressions can be contained in within the ramifications and scope. In hybrid systems or in an intersection of two systems, for example, in the UTRAN and IPDC networks, the appropriate principle is to have the co-operation of such systems by a partial handover between the networks. Preferably, the Inter-system based handover is applied, where a handover is made from a mobile cellular system employing, for example, WCDMA to a broadband cellular system, employing, for example, DVB-T or vice versa. The handover is partial in such a way that with respect to the generally bi-directional based data communications network the downlink data is principally applied in the handover. Thus, for example, in a handover from UTRAN to IPDC the handover is partial. The service related to the downlink of UTRAN is moved to the IPDC network. Also, in a handover from the generally unidirectional data communications domain to the generally bi-directional data communications domain the service of the unidirectional domain is handed over to the downlink of the bi-directional domain. This is because of the historical principally delivery (unidirectional) nature of the digital unidirectional networks.

In yet various embodiments, the handover is as well applicable in case of intra- and intersystem handover from/to GSM/GSM EDGE/GPRS networks. Thus in these cases the exemplary handover processes does not necessary take place in DVB, but, for example, the above identified networks can be used. Perhaps now the new or current handover service domain is unidirectional and the other bi-directional.

In yet various embodiments the intra system handover or the like can be applied. For example, in these cases the MSC is capable of communicating with RNS-A (Radio network system of UMTS) and BSS-B (base station system of GSM). Perhaps it may be the actual system does not need to be changed but the service can still be handed over between the generally unidirectional transmission mode and the generally bi-directional transmission mode. The downlink can be handed over to the equivalent unit than BS or HE.

In yet various embodiments the type of intersystem handover can be applied. For example, this perhaps changes traffic from MSC-A to MSC-B at the same time. As in the embodiments of the intra handover from, e.g. UMTS to IPDC (and vice versa), it is clear for person skilled in art that similar procedure of the partial handover can be done in inter-system handover procedure.

Although the description above contains many specifics, these are merely provided to illustrate the invention and should not be construed as limitations of the invention's scope. Thus it will be apparent to those skilled in the art that various modifications and variations can be made in the devices, systems and processes of the present invention without departing from the spirit or scope of the invention.

The invention claimed is:

1. A method, comprising:
   determining to communicate traffic via an uplink connection of a digital bi-directional communications service,
   receiving a measurement about available downlink radio signals,
   determining to select according to a predetermined criteria one of the available downlink radio signals,
   determining to change to the selected available downlink radio signal for in part performing a handover so that said handover is performed only between a downlink of the digital bi-directional communications service and a digital unidirectional broadcast communications service, and
   determining to complete said handover, wherein with said completion of said handover traffic communication is maintained via the uplink connection of the digital bi-directional communications service, wherein the traffic was communicated, prior to said handover, via the same uplink connection.

2. A method as claimed in claim 1, wherein the changing includes determining to send a partial handover command.

3. A method as claimed in claim 2, wherein a user apparatus determines to listen to the downlink radio signal, and determines to send a report on a listening result to a network element deciding the handover.

4. A method according to claim 1, wherein said method comprises performing the handover from a digital broadband data communication domain to a cellular mobile data communication domain or vice versa.

5. A method according to claim 1, wherein said method comprises selecting the downlink radio signal via a measurement signalling structure of Intersystem handover of UMTS for the handover between said services.

6. A method according to claim 1, wherein said handover relates to a certain service leaving any other service transmitted via networks of said services still usable for a user apparatus.

7. A method according to claim 1, wherein, in said method, the handover process is adapted to use a native network level signalling for application independent handover between said services.

8. A method according to claim 1, wherein said services are adapted to pertain to domains comprising a hybrid network system containing at least two functionally different network systems.

9. A method according to claim 1, wherein the method further comprises determining to continue unidirectional communication service reception in another cell area from current downlink communication received in a first cell area.

10. A method according to claim 1, wherein the digital unidirectional communications service pertains to a domain comprising DVB-T cells establishing a DVB-T network.

11. A method according to claim 1, wherein the digital unidirectional communications service comprises a wireless multi-carrier signal transmission.

12. A method according to claim 1, wherein said services pertain to domains comprising cells of wireless cellular networks and a user apparatus is adapted to wirelessly communicate with said domains.

13. An apparatus, comprising: a processor configured to perform the method according to claim 1 when in operation.

14. An article of manufacture, comprising a computer readable medium containing computer readable program code configured to perform the method of claim 1 when run on a computer.

15. A method as claimed in claim 1, wherein uplink can be maintained when said partial handover is performed.

16. A method as claimed in claim 1, wherein the partial handover relates only to downlink radio communications.

17. A method as claimed in claim 16, wherein the partial handover relates only to downlink radio communications of the bi-directional communications service and the unidirectional broadcast communications service.

18. A method as claimed in claim 1, wherein the partial handover is configured to be related to the service between a transmission of the unidirectional broadcast communications service and a transmission of the downlink of the bi-directional communications service.

19. A method as claimed in claim 1, further comprising determining to maintain on a basis of said uplink a bi-directional interaction channel to the digital unidirectional broadcast communication service.

20. A method, comprising:
    determining to communicate, from a user apparatus, traffic via an uplink connection of a cellular mobile data communication domain,
    determining to measure, at the user apparatus, received downlink radio signals of the cellular mobile data communication domain and a digital broadcast data communication domain,
    determining to send a measurement report of said received downlink radio signals to said cellular mobile data communication domain,
    receiving a handover command at said user apparatus for changing to another available downlink radio signal,
    determining to send a confirmation from said user apparatus to the digital broadcast data communication domain for moving a downlink service delivered via the cellular mobile data communication domain to the digital broadcast data communication domain, wherein a handover corresponding to said command comprises a partial handover so that the signals and service relating to a downlink of the cellular mobile data communication domain are configured to be handed over to the digital broadcast data communication domain, and
    determining to complete, at said user apparatus, said handover, wherein with said completion of said handover traffic communication is maintained via the uplink connection of the cellular mobile data communication domain, wherein the traffic was communicated, prior to said handover, via the same uplink connection.

21. A method according claim 20, further comprising communicating in such a way that the cellular mobile data communication domain requests resources from the digital broadcast data communication domain, and obtaining an acknowledgement on available resources of the digital broadcast data communication domain at the cellular data communication domain.

22. A method, comprising:
    determining to communicate, from a user apparatus, traffic via an uplink connection of a cellular mobile data communication domain,
    determining to measure, at said user apparatus, received downlink radio signals of a digital broadcast data communication domain and the cellular mobile data communication domain,
    determining to send a measurement report of said received downlink radio signals to said digital broadcast data communication domain,
    receiving a handover command at said user apparatus for changing to another available downlink radio signal,
    determining to send a confirmation from said user apparatus to the cellular mobile data communication domain for moving a downlink service delivered via the digital broadcast data communication domain to a downlink of the cellular mobile data communication domain, wherein a handover corresponding to said command comprises a partial handover so that signals and service relating to the digital broadcast data communication domain are configured to be handed over to a downlink of the cellular mobile data communication domain, and
    determining to complete, at said user apparatus, said handover, wherein with said completion of said handover traffic communication is maintained via the uplink connection of the cellular mobile data communication domain, wherein the traffic was communicated, prior to said handover, via the same uplink connection.

23. A method according to claim 22, further comprising communicating in such a way that the digital broadcast data communication domain requests resources of the cellular mobile communication domain, and obtaining an acknowledgement on available resources of the cellular mobile communication domain at the digital broadcast data communication domain.

24. An apparatus, comprising:
    a processor; and
    a memory including computer program code, the memory and the computer program code configured to, with the processor, cause the apparatus at least to perform:
    determine to communicate traffic via an uplink connection of a digital bi-directional communications service,
    receive a measurement about available downlink radio signals,
    determine to select according to a predetermined criteria one of the available downlink radio signals,
    determine to change to the selected available downlink radio signal for in part performing a handover corresponding to said command so that said handover is configured to be established performed only between a downlink of the digital bi-directional communications service and a digital unidirectional broadcast communications service, and
    determine to complete said handover, wherein with said completion of said handover traffic communication is maintained via the uplink connection of the digital bi-directional communications service, wherein the traffic was communicated, prior to said handover, via the same uplink connection.

25. An apparatus, comprising:
    a transceiver configured to determine to communicate traffic via an uplink connection of a cellular mobile data communication domain,
    a receiver configured to determine to measure received downlink radio signals of the cellular mobile data communication domain and a digital broadcast data communication domain, said transceiver further configured to determine to send a measurement report of said received downlink radio signals to said cellular mobile data communication domain, said receiver further configured to receive a handover command for changing to another available downlink radio signal, and said transceiver further configured to determine to send a confirmation to the digital broadcast data communication domain for moving a downlink service delivered via the cellular mobile data communication domain to the digital broadcast data communication domain, wherein a handover corresponding to said command comprises a partial handover so that the signals and service relating to a downlink of the cellular mobile data communication domain are configured to be handed over to the digital broadcast data communication domain and determine to complete said handover, wherein with said completion of said handover traffic communication is maintained via the uplink connection of the cellular mobile data communication domain, wherein the traffic was communicated, prior to said handover, via the same uplink connection.

26. An apparatus, comprising:

a processor configured to determine to communicate traffic via an uplink connection of a cellular mobile data communication domain, a receiver configured to determine to measure received downlink radio signals of a digital broadcast data communication domain and the cellular mobile data communication domain, said processor further configured to determine to send a measurement report of said received downlink radio signals to said digital broadcast data communication domain, said processor further configured to receive a handover command for changing to another available downlink radio signal, said processor further configured to determine to send a confirmation to the cellular mobile data communication domain for moving a downlink service delivered via the digital broadcast data communication domain to a downlink of the cellular mobile data communication domain, wherein a handover corresponding to said command comprises a partial handover so that signals and service relating to the digital broadcast data communication domain are configured to be handed over to a downlink of the cellular mobile data communication domain, and said processor further configured to determine to complete said handover, wherein with said completion of said handover traffic communication is maintained via the uplink connection of the cellular mobile data communication domain, wherein the traffic was communicated, prior to said handover, via the same uplink connection.

\* \* \* \* \*